United States Patent

Davis

Patent Number: 5,844,986
Date of Patent: Dec. 1, 1998

[54] SECURE BIOS

[75] Inventor: Derek L. Davis, Phoenix, Ariz.

[73] Assignee: Intel Corporation, Santa Clara, Calif.

[21] Appl. No.: 724,176

[22] Filed: Sep. 30, 1996

[51] Int. Cl.[6] .................................................. H04L 9/00
[52] U.S. Cl. ................................................. 380/4; 380/25
[58] Field of Search ................................. 380/23, 25, 3, 380/4, 49

[56] References Cited

U.S. PATENT DOCUMENTS

| | | | |
|---|---|---|---|
| 5,022,077 | 6/1991 | Bealkowski et al. . | |
| 5,144,659 | 9/1992 | Jones . | |
| 5,289,540 | 2/1994 | Jones .......................................... | 380/4 |
| 5,359,659 | 10/1994 | Rosenthal . | |
| 5,377,264 | 12/1994 | Lee et al. . | |
| 5,386,469 | 1/1996 | Yearsley et al. ........................... | 380/3 |
| 5,421,006 | 5/1996 | Jablon . | |
| 5,444,850 | 8/1995 | Chang ........................................ | 380/23 |
| 5,450,489 | 9/1995 | Ostrover et al. . | |
| 5,465,299 | 11/1995 | Matsumoto et al. . | |
| 5,479,509 | 12/1995 | Ugon . | |
| 5,568,552 | 10/1996 | Davis .......................................... | 380/4 |
| 5,584,023 | 12/1996 | Hsu . | |
| 5,644,636 | 7/1997 | Fernandez .................................. | 380/4 |
| 5,666,411 | 9/1997 | McCarty . | |

*Primary Examiner*—David Cain
*Attorney, Agent, or Firm*—Blakely, Sokoloff, Taylor & Zafman

[57] ABSTRACT

A subsystem prevents unauthorized modification of BIOS program code embedded in modifiable non-volatile memory devices such as flash memory. A cryptographic coprocessor containing the BIOS memory device performs authentication and validation on the BIOS upgrade based on a public/private key protocol. The authentication is performed by verifying the digital signature embedded in the BIOS upgrade.

43 Claims, 3 Drawing Sheets

SECURE BIOS

BACKGROUND OF THE INVENTION

1. Field of the Invention

This invention relates to the field of security of computer firmware, especially in the areas of Basic Input and Output System ("BIOS") in general computing systems, such as personal computers ("PCs").

2. Description of Related Art

One of the most critical elements in a computer system is the boot-up firmware, such as the Basic Input and Output System ("BIOS"). Typically stored in some form of non-volatile memory, the BIOS is machine code, usually part of an Operating System ("OS"), which allows the Central Processing Unit ("CPU") to perform tasks such as initialization, diagnostics, loading the operating system kernel from mass storage, and routine input/output ("I/O") functions.

Upon power up, the CPU will "boot up" by fetching the instruction code residing in the BIOS. Due to its inherent nature, the BIOS has two conflicting requirements: (1) it should be well protected because if it is modified or destroyed, the entire system will fail, (2) it should be easily modifiable to allow field upgrade for feature enhancement or removal of software bugs.

Traditionally, BIOS is implemented in Erasable Programmable Read Only Memory ("EPROM"). EPROM has an advantage of not being modified in circuit. To modify the contents of the EPROM, the device must be first erased by being removed from the socket and exposed to Ultraviolet light for a prolonged period of time. In this respect, BIOS implemented in EPROM is resistant to virus attack and other electronic sabotages. However, EPROM devices do not support "field upgrades" because these devices are not in-circuit programmable, which is a necessary characteristic for field upgrades. Field upgrading allows customers to upgrade the BIOS in the field to avoid costly delay and parts exchanges. Because of the importance for field upgrading, virtually all BIOS firmware is now implemented using flash memories. However, being field modifiable, BIOS flash memories are vulnerable to virus attacks which could cause devastating results in sensitive applications such as financial transactions.

With no security protection, conventional computer architectures implemented with BIOS flash memories are vulnerable to many kinds of intrusive attacks, such as a virus attack. In a typical virus attack, the virus code executes a code sequence to modify the BIOS flash memory. The code in BIOS flash memory, having no protection, is corrupted and the destructive effects may become effective immediately, when the system is booted up the next time, or when certain conditions or events have occurred. The infected code may further propagate to other areas of the BIOS code or the operating system kernel. Because the BIOS is the first program code to execute when the computer system is "powered up", prior to any system or network virus scanning software, detection and eradication of a BIOS-based virus is extremely difficult. The BIOS-based virus can "hide its tracks" from such scanning software, effectively becoming invisible.

The primary focus of the present invention, therefore, is to prevent corrupting the BIOS by a computer virus. This is achieved by imposing an authentication and validation procedure before the contents of the BIOS flash memory are modified.

The approach which is pursued in this invention builds on the concept of BIOS authentication by incorporating the BIOS flash memories into existing hardware with authenticating capability such as the cryptographic coprocessor. Since the cryptographic coprocessor both stores the BIOS and enforces authentication of BIOS updates, an attacker has no means by which to corrupt the BIOS contents.

SUMMARY OF THE INVENTION

The present invention describes a system to securely update an executable code. The system comprises of a first storage element for storing a code update, a second storage element for storing the executable code that needs to be updated, an identification code for identifying the first storage element and the code update, and a security processor. The security processor is coupled to the second storage element to authenticate and validate the first storage element and the code update using the device identification.

BRIEF DESCRIPTION OF THE DRAWINGS

The features and advantages of the present invention will become apparent from the following detailed description of the present invention in which.

DESCRIPTION OF THE PREFERRED EMBODIMENT

The present invention provides a procedure to authenticate and validate a code update, such as a BIOS upgrade for example, using cryptographic technology. In the following description, some terminology is used to discuss certain cryptographic features. A "key" is an encoding and/or decoding parameter used by conventional cryptographic algorithms such as Rivest, Shamir and Adleman ("RSA"), Data Encryption Algorithm ("DEA") as specified in Data Encryption Standard ("DES") and the like. A "certificate" is defined as any digital information (typically a public key) associated with an entity, encrypted by a private key held by another entity such as a manufacturer or a widely published trusted authority (e.g., bank, governmental entity, trade association, etc.). A "digital signature" is similar to a certificate but is typically used for authenticating data. Herein, the term "secure" indicates that it is computationally infeasible for an interloper to successfully perpetuate fraud on a system. A security processor is an electronic device capable of performing security functions to provide security protection for the system.

The authentication and validation are performed by a security processor which contains the BIOS firmware. One example of such a security processor is a cryptographic coprocessor. The cryptographic processor authenticates and validates the BIOS firmware by using secret information such as a digital signature embedded in the BIOS upgrade.

Figure 1:
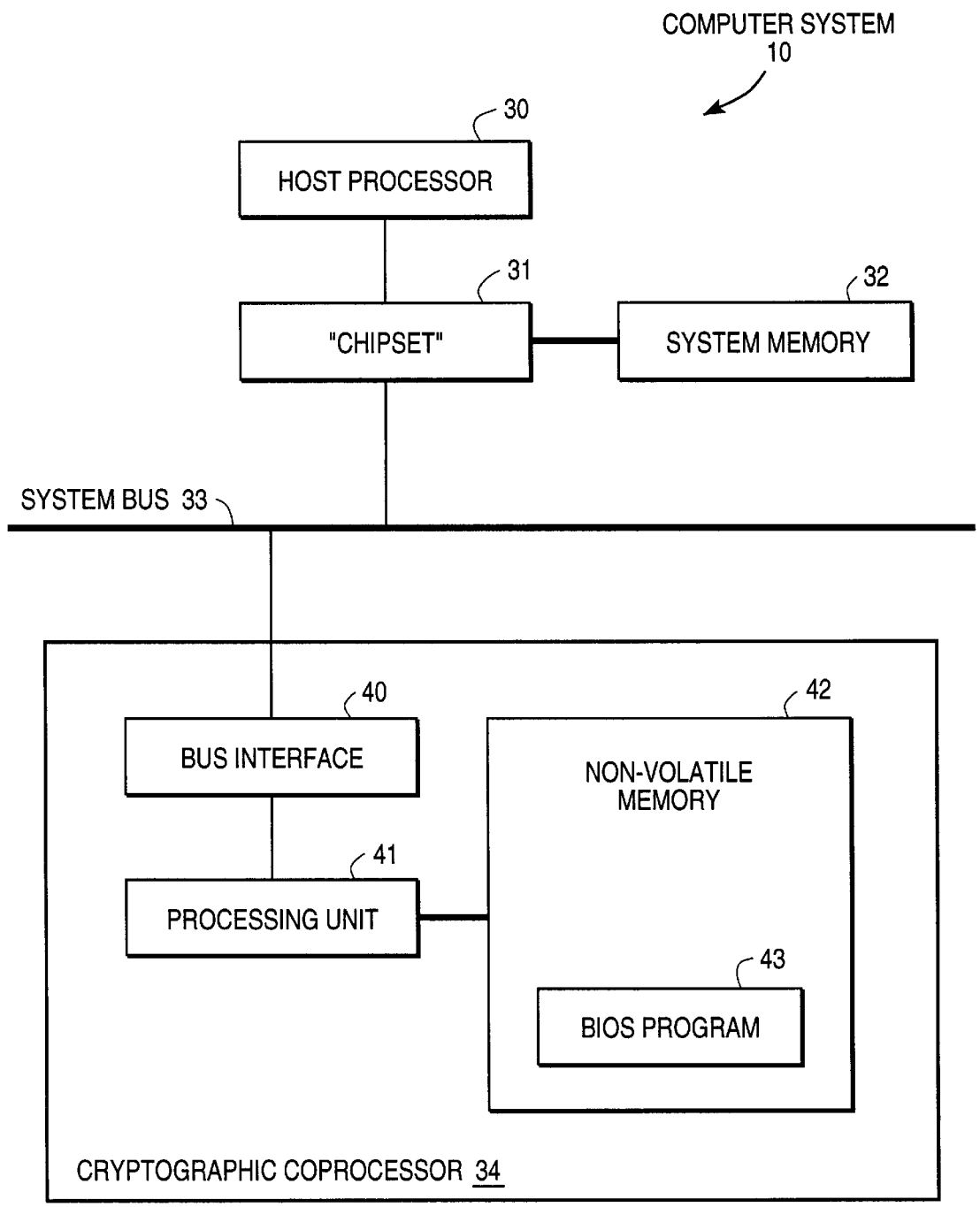
FIG. 1 is a diagram of the present invention where the BIOS flash memory resides inside a cryptographic coprocessor which may be interfaced to the PCI bus.

Referring to FIG. 1, an embodiment of a computer system implemented within the present invention is shown. The computer system 10 includes a chipset 31 which operates as an interface to support communications between host processor 30, system memory 32, and devices coupled to a system bus 33. System memory 32 may include, but is not limited to conventional memory such as various types of random access memory ("RAM"), e.g., DRAM, VRAM, SRAM, etc., as well as memory-mapped I/O devices. System bus 33 may be implemented in compliance with any type of bus architecture including Peripheral Component Interconnect ("PCI"), a Universal Serial Bus ("USB") and the like.

One of the devices that may be coupled to the system bus 33 includes a cryptographic coprocessor 34. Cryptographic coprocessor 34 comprises a bus interface 40, a processing unit 41 and a local non-volatile memory 42. The bus interface 40 is used to establish an electrical connection to system bus 33. Processing unit 41 is used as the main controller for the cryptographic coprocessor 34. Processing unit 41 interfaces to its own local non-volatile memory 42. The boot-up program 43 is stored within non-volatile memory 42. It is contemplated that non-essential elements have not been illustrated to avoid obscuring the present invention. Examples of the non-essential elements that may be employed within the cryptographic coprocessor 34 include RAM, a random number generator, and various cryptographic algorithm accelerators. Furthermore, although host processor 30 is shown separate from cryptographic coprocessor 34 in FIG. 1, cryptographic coprocessor 34 may be part of host processor 30 in which case host processor 30 accesses the BIOS program directly without going through system bus 33.

Figure 2:
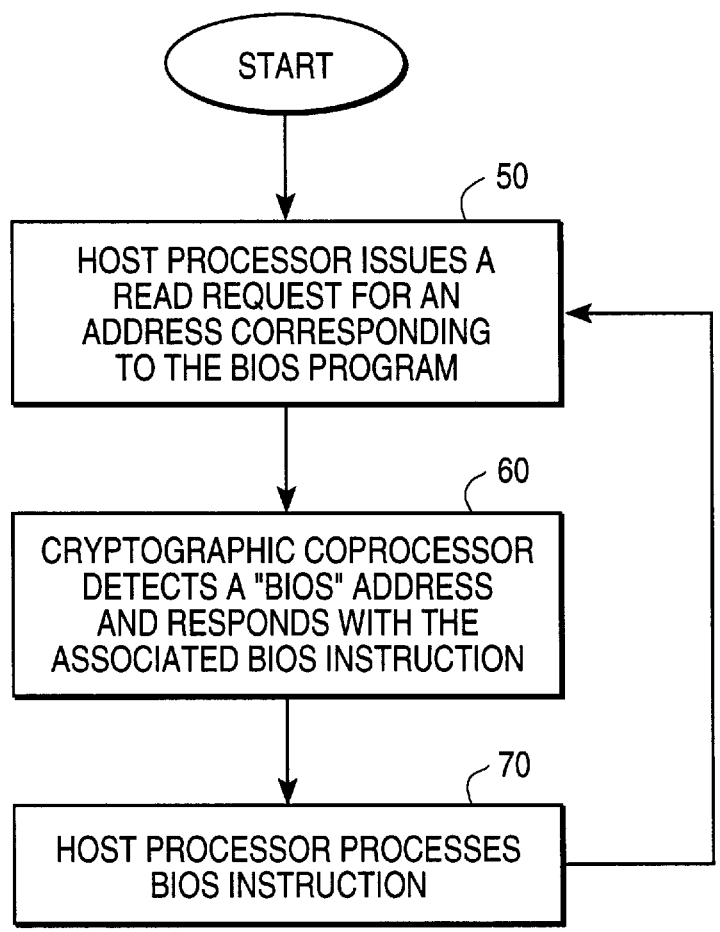
FIG. 2 is a flowchart of the operations that occur in the present invention during a normal read access to the BIOS program by the host processor.

In FIG. 2, the steps associated with the "boot up" phase of the system are shown. First, in step 50, the host processor issues a read request for an address corresponding to the BIOS program. The cryptographic coprocessor responds to that request with the associated BIOS instruction (Step 60). Lastly, the host processor processes that data in step 70. To continue processing BIOS instructions, this sequence is repeated.

In a typical field BIOS upgrade, the software manufacturer (the BIOS vendor) will send the user a diskette containing the new BIOS code, and the code to perform the upgrade operations. It is also possible for the BIOS vendor to establish a bulletin board system, or a data superhighway connection such as the Internet, to allow users to download the BIOS upgrade electronically and remotely. BIOS upgrading essentially involves erasing and writing to the BIOS flash memory.

Figure 3:
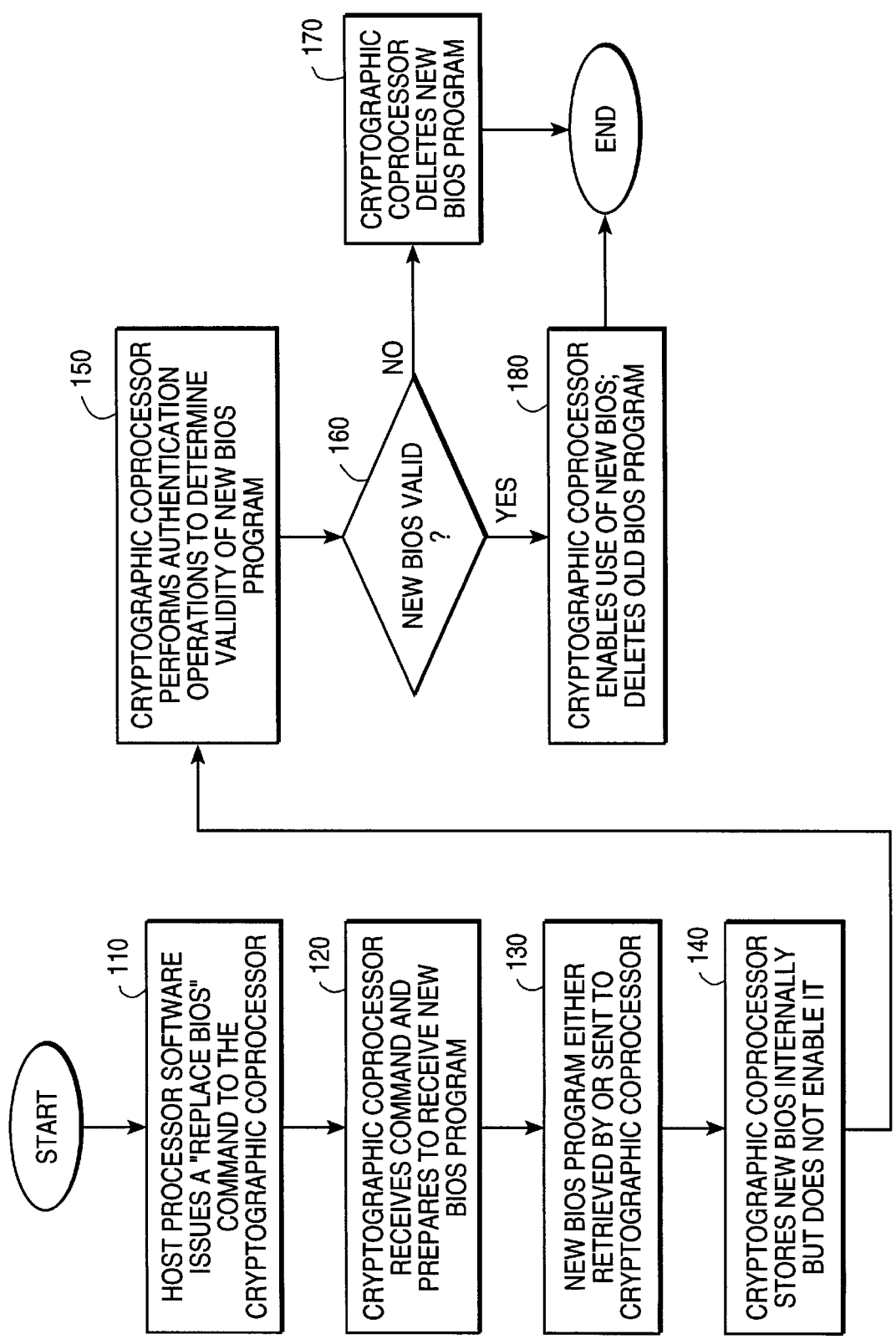
FIG. 3 is a flowchart of the operations that occur in the present invention during a field upgrade of the BIOS program.

In FIG. 3, the steps associated with a modification of the BIOS program are shown. In step 110, the host processor issues a "replace BIOS" command to the cryptographic coprocessor. This command would typically be generated by some type of BIOS management utility software, running either on the host processor itself or on a remote system. The purpose of this command is to prepare the cryptographic coprocessor for a new BIOS program (step 120). In step 130, the cryptographic coprocessor either passively receives the new BIOS program code from the host processor or actively retrieves it from a specified source (e.g. system memory). In step 140, the new BIOS program is stored internally or in a protected manner to assure that future authentication operations are performed on the specified "new BIOS program". In step 150, the cryptographic coprocessor performs the appropriate authentication operations on this internally stored version of the new BIOS program. There are many ways such authentication can be performed, including the use of secret information known only to the BIOS provider and the deployed cryptographic coprocessor. It is contemplated that public/private key cryptography may be used as part of the authentication procedure, specifically using the well-known techniques of digital signatures and certificates to validate the integrity and validity of the "new BIOS program". Whatever authentication technique is used, the salient feature is that it is performed within the cryptographic coprocessor on the local version of the new BIOS program. Once the authentication operations have been performed, in step 160, the cryptographic coprocessor can make a determination as to the validity of the new BIOS program. For example, the digital signature supplied with the "new BIOS program" may be valid, but the revision date may be inappropriate (e.g. older than the currently installed BIOS). If the new BIOS is determined to be invalid, it is deleted by the cryptographic coprocessor and is never used (step 170). If the new BIOS is valid, the new BIOS program is made operational and the previous BIOS program is deleted (step 180). Note that at this point, it would be normal to reboot the computer system to assure system-wide consistency.

To support this digital signature-based method of BIOS authentication, the digital signature embedded in the distribution BIOS software upgrade should be underwritten or endorsed by an industry association, or a similar organization or procedure. The participants in this industry association are the BIOS vendors who want to be able to field upgrade their BIOS code. One of the functions of this industry association is to issue digital certificates to its BIOS vendor members, essentially assigning a digital certificate to each vendor to be used in BIOS upgrade software. This association provides its public key to be used by the cryptographic coprocessor during the BIOS authentication procedure. The cryptographic coprocessor will be preloaded with the public key of the industry association for BIOS vendors so that it will be able to verify any digital signature embedded in the BIOS upgrade code. Alternatively, the cryptographic coprocessor may be preloaded with another public key that may be used to authenticate a certificate chain to obtain this industry association public key. The BIOS upgrade code could be encrypted if necessary (to protect the code from being reverse engineered for example). Since the digital signature or the certificate issued by the industry association normally represents the authenticity of a reputable or credible BIOS vendor, an intruder cannot corrupt the BIOS code (unless of course he or she somehow obtains secret private keys used to create such signatures or certificates) either directly or indirectly by virus attack.

In another embodiment (not shown), the cryptographic coprocessor is part of the host processor. The host processor contains both the cryptographic coprocessor and the BIOS program. The host processor, acting itself as the security processor, performs the authentication and validation on the BIOS upgrade in the similar fashion as described above. The host processor will be preloaded with the public key of the industry association for BIOS vendors so that it will be able to verify any digital signature embedded in the BIOS upgrade code.

Yet, in another embodiment (not shown), the BIOS program is located in a printed-circuit board ("PCB") or card plugged into a system expansion slot. The cryptographic coprocessor may be located on the same PCB or card or on another PCB or card or even inside the host processor. Regardless whether it is located in the system, as long as the cryptographic coprocessor is able to access the BIOS program, it can carry out the authentication and validation operations as described above.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for securely updating an executable code, comprising:
   first storage means for storing a code update;
   second storage means for storing said executable code; and
   first processing means for authenticating and validating said code update, said first processing means being coupled to said second storage means.

2. The system of claim 1 wherein the executable code includes a Basic Input and Output System (BIOS).

3. The system of claim 1 wherein the first storage means is one of a mass storage device and a file capable of being sent electronically in a computer network.

4. The system of claim 1 wherein the second storage means includes a modifiable non-volatile memory device.

5. The system of claim 1 wherein the first processing means includes a cryptographic processor.

6. The system of claim 1 wherein the first processing means uses at least one digital certificate to authenticate the code update and a digital signature to validate the code update.

7. The system of claim 1 wherein said executable code is encrypted to produce an encrypted code.

8. The system of claim 1 further comprising:
   second processing means for communicating with said first processing means in order to execute said executable code.

9. The system of claim 7 wherein said encrypted code is decrypted to produce a decrypted code.

10. A system for securely updating an executable code, comprising:
    a first storage element for containing a code update;
    a second storage element that contains said executable code; and
    a security processor coupled to said second storage element, said security processor for authenticating said code update based on at least one certificate and validating said code update based on a digital signature.

11. The system of claim 10 wherein the executable code includes a Basic Input and Output System (BIOS).

12. The system of claim 10 wherein the digital signature is part of the code update.

13. The system of claim 10 wherein the second storage element includes a modifiable non-volatile memory device.

14. The system of claim 10 wherein the security processor is mounted on a removable card.

15. The system of claim 11 wherein said at least one certificate includes an encrypted version of a public key of a vendor of the BIOS.

16. The system of claim 10 wherein said executable code is contained in an encrypted format.

17. The system of claim 10 further comprising:
    a host processor for communicating with said security processor in order to execute said executable code.

18. The system of claim 16 wherein said encrypted code is decrypted before execution.

19. A method for securely updating an executable code, the method comprising:
    providing a first storage element for storing a code update;
    providing a second storage element for storing said executable code;
    configuring said first storage element to contain at least one certificate;
    providing a security processor for accessing said second storage element;
    authenticating said code update based on said at least one digital certificate by said security processor; and
    updating said executable code with said code update if said code update is authenticated.

20. The method of claim 19, wherein before said updating step, the method further comprises a step of validating said code update.

21. The method of claim 19 wherein the executable code includes a Basic Input and Output System (BIOS).

22. The method of claim 19, wherein said executable code provided in the second storage element is in an encrypted format.

23. The method of claim 19 further comprising:
    providing a host processor for communicating with said security processor in order to execute said executable code.

24. A system comprising:
    a first storage element for containing a code update;
    a second storage element that contains an executable code; and
    a security processor coupled to said second storage element, the security processor for authenticating the code update based on at least one certificate.

25. The system of claim 24 wherein the executable code includes a Basic Input and Output System (BIOS).

26. The system of claim 24 wherein the at least one certificate includes an encrypted version of a public key of a vendor of the BIOS.

27. The system of claim 24 wherein the second storage element includes a modifiable non-volatile memory device.

28. The system of claim 24 wherein the security processor further validating the code update through a digital signature being part of the code update.

29. The system of claim 28 wherein the security processor further loading the code update into the second memory element after the code update has been authenticated and validated.

30. The system of claim 24 wherein the security processor is mounted on a removable card.

31. The system of claim 24 wherein the executable code is in an encrypted format when contained in the second storage element.

32. The system of claim 24 further comprising:
    a host processor for communicating with said security processor in order to execute the executable code.

33. A system comprising:
    a first storage element for containing a code update;
    a second storage element that contains an executable code; and
    a security processor coupled to the second storage element, the security processor for validating said code update.

34. The system of claim 33 wherein the security processor substituting the code update for the executable code when the code update is validate.

35. The system of claim 33 wherein the executable code includes a Basic Input and Output System (BIOS).

36. The system of claim 33 wherein the digital signature is part of the code date.

37. The system of claim 33 wherein the second storage element includes a modifiable non-volatile memory device.

38. The system of claim 33 wherein the security processor further authenticating the code update with at least one certificate including a public key of a vendor of the BIOS.

39. A system comprising:

a first storage element that contains information;

a second storage element for containing update information; and a security processor coupled to the first storage element, the security processor validating the update information to determine whether the update information is to be subsequently loaded into the first storage element.

40. The system of claim 39, wherein the security processor further authenticating the update information to determine that the update information originated from a predetermined source.

41. The system of claim 40 wherein the information includes an executable code.

42. The system of claim 41, wherein the executable code includes Basic Input and Output System (BIOS).

43. The system of claim 42, wherein the predetermined source includes a selected BIOS vendor.

* * * * *

UNITED STATES PATENT AND TRADEMARK OFFICE
CERTIFICATE OF CORRECTION

PATENT NO.    : 5,844,986
DATED         : December 1, 1998
INVENTOR(S)   : Davis It is certified that error appears in the above-identified patent and that said Letters Patent is hereby corrected as shown below:

Column 6,
Line 65, delete "date" and insert -- update --.

Signed and Sealed this

Seventeenth Day of August, 2004

JON W. DUDAS
*Acting Director of the United States Patent and Trademark Office*